United States Patent [19]

Iwamuro et al.

[11] Patent Number: 4,794,886
[45] Date of Patent: Jan. 3, 1989

[54] INTAKE DEVICE OF AN INTERNAL COMBUSTION ENGINE

[75] Inventors: Minoru Iwamuro, Okazaki; Kazunori Ishii, Toyoake; Naohito Sarai, Nagoya, all of Japan

[73] Assignees: Toyota Jidosha Kabushiki Kaisha; Aisan Industry Co., Ltd., both of Aichi, Japan

[21] Appl. No.: 176,350

[22] Filed: Mar. 31, 1988

[30] Foreign Application Priority Data

Apr. 1, 1987 [JP] Japan .............................. 62-047643[U]
Apr. 1, 1987 [JP] Japan .............................. 62-047642[U]
Apr. 2, 1987 [JP] Japan .............................. 62-048940[U]

[51] Int. Cl.$^4$ ............................................. F02B 75/18
[52] U.S. Cl. ............................. 123/52 M; 123/52 MC
[58] Field of Search ......... 123/52 M, 52 MV, 52 MB, 123/52 MC

[56] References Cited

U.S. PATENT DOCUMENTS 4,708,097 11/1987 Hatamura et al. ............... 123/52 M
4,736,714 4/1988 Hokazono et al. .............. 123/52 M
4,738,229 4/1988 Wada et al. .................... 123/52 MV

FOREIGN PATENT DOCUMENTS 56-115818 9/1981 Japan .
61-48923 4/1986 Japan .
61-132437 8/1986 Japan .
62-88832 6/1987 Japan .

Primary Examiner—Charles J. Myhre
Assistant Examiner—David A. Okonsky
Attorney, Agent, or Firm—Kenyon & Kenyon

[57] ABSTRACT

An intake device of an engine comprising a surge tank. The interior of the surge tank is divided into a first interior chamber and a second interior chamber by a separating wall. The separating wall has a cutaway portion into which the separating wall portion of a valve holder is inserted, and a control valve is arranged in the separating wall portion. The clearance between the separating wall portion and the wall of the cutaway portion is sealed by a band-like seal member.

20 Claims, 7 Drawing Sheets

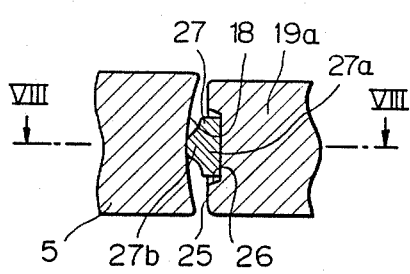
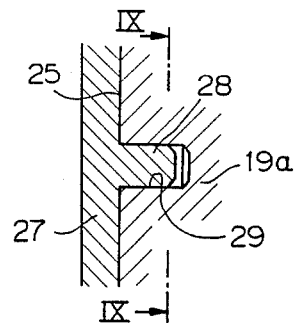
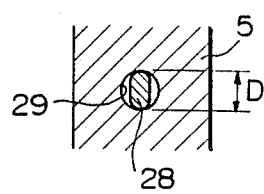
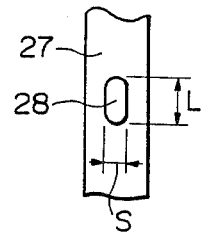
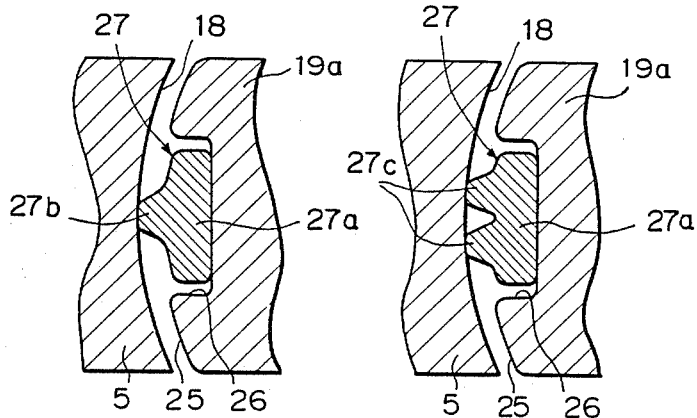

INTAKE DEVICE OF AN INTERNAL COMBUSTION ENGINE

BACKGROUND OF THE INVENTION

1. Field of the Invention

The present invention relates to an intake device of an internal combustion engine.

2. Description of the Related Art

In a known engine having a butterfly valve within a surge tank, the interior of the surge tank is divided into a first interior chamber and a second interior chamber by the butterfly valve when the butterfly valve is completely closed, and the first interior chamber and the second interior chamber are interconnected when the butterfly valve is fully open (see, for example, Japanese Unexamined Patent Publication No. 56-115818). In this engine, to obtain a high volumetric efficiency over the entire range of an engine speed by using an air pulsating operation, the equivalent pipe length of the intake passage is changed in accordance with an engine operating state by fully closing or fully opening the butterfly valve. However, in this engine, if only a small amount of air leakage occurs at the butterfly valve when the butterfly valve is fully closed, the air pulsating operation is weakened, and thus it is impossible to obtain a desired high volumetric efficiency. Consequently, in this engine, when the butterfly valve is fully closed, a tight seal is required for the butterfly valve, although the butterfly valve per se already has a good sealing ability.

Nevertheless, when the butterfly valve is actually arranged in the surge tank, the machining of the valve seat for the butterfly valve is difficult and the assembling of the butterfly valve in the surge tank is also difficult. Consequently, although the butterfly valve is very suitable for an air pulsating system, a special arrangement becomes necessary to obtain a good sealing operation and an easy assembling of the butterfly valve. Therefore, to obtain such a good sealing operation and easy assembling, an intake device is known in which a valve holder holding the butterfly valve therein is formed separately from the surge tank and fitted into a cutaway portion formed in the surge tank (see, Japanese Unexamined Utility Model Publication No. 61-48923).

However, in this intake device, the valve holder is merely fitted into the cutaway portion of the surge tank, and thus a clearance is formed at the mating face of the valve holder and the cutaway portion. As a result, since air will leak through this clearance, the air pulsating operation is weakened, and a problem arises in that it is impossible to obtain a desired high volumetric efficiency.

SUMMARY OF THE INVENTION

An object of the present invention is to provide an intake device of an engine, which is capable of obtaining a desired high volumetric efficiency by completely sealing any clearance between the valve holder and the cutaway portion of the surge tank.

Therefore, according to the present invention, there is provided an intake device of an internal combustion engine comprising first cylinders having intake strokes which do not overlap with each other, and second cylinders having intake strokes which do not overlap with each other, the intake device comprising: an air cleaner; a surge tank having a first end and a second end positioned opposite to the first end; a separating wall extending from the first end to the second end within the surge tank to divide an interior of the surge tank into a first interior chamber connected to the first cylinders and a second interior chamber connected to the second cylinders, the first end of the surge tank having an opening, the separating wall having a cutaway portion formed adjacent to the opening and having an inner circumferential wall; an air duct connected to the second end of the surge tank to interconnect both the first interior chamber and the second interior chamber to the air cleaner via the air duct; a valve holder formed separately from the surge tank and comprising a lid portion which covers the opening, and a separating wall portion which is fitted into the cutaway portion and has an outer circumferential wall facing the inner circumferential wall of the cutaway portion when the valve holder is attached to the surge tank, the separating wall portion having a connecting bore formed therein an interconnecting the first interior chamber and the second interior chamber, the outer circumferential wall of the separating wall portion having a groove formed thereon and extending over the entire length thereof; a control valve arranged in the connecting bore and actuated in response to a change in an operating state of the engine; and a band-like seal member arranged in the groove and extending approximately the entire length of the groove, the seal member coming into contact with the inner circumferential wall of the cutaway portion to provide a seal between the inner circumferential wall of the cutaway portion and the outer circumferential wall of the separating wall portion.

The present invention may be more fully understood from the description of preferred embodiments of the invention set forth below, together with the accompanying drawings.

BRIEF DESCRIPTION OF THE DRAWINGS

In the drawings:

FIG. 7 is a cross-sectional view of the separating wall and the separating wall portion, showing the separating wall when fitted into the cutaway portion;

FIG. 8 is a cross-sectional view of the separating wall portion and the seal member, taken along the line VIII—VIII in FIG. 7;

FIG. 9 is a cross-sectional view of the separating wall portion and the projection, taken along the line IX—IX in FIG. 8;

FIG. 10 is a view illustrating the inner circumferential wall of the seal member;

FIG. 11 is an enlarged cross-sectional view of FIG. 7;

FIG. 12 is an enlarged cross-sectional view, illustrating another embodiment of the seal member;

DESCRIPTION OF THE PREFERRED EMBODIMENTS

First, a basic operation of an air pulsating system according to the present invention will be described with reference to FIGS. 19 and 20.

Figure 19:
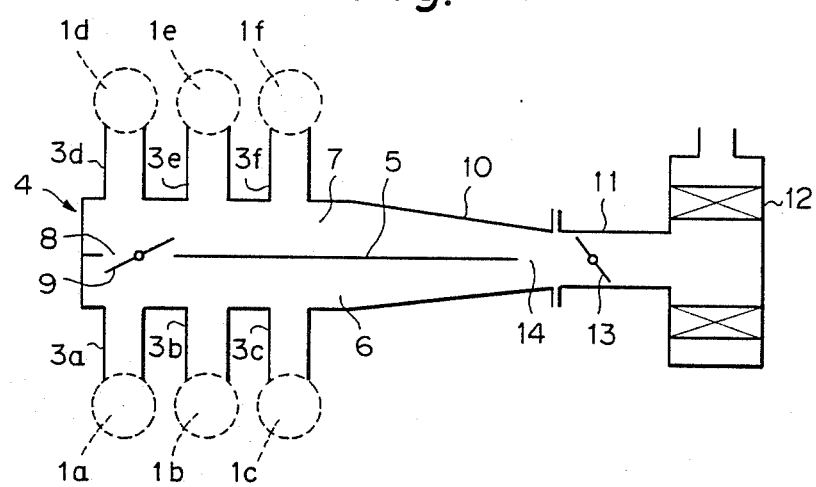
FIG. 19 is a schematically illustrated view of an intake system of an engine.

Referring to FIG. 19, reference numerals 1a, 1b, 1c designate a first group of engine cylinders having intake strokes which do not overlap with each other, 1d, 1e, 1f a second group of engine cylinders having intake strokes which do not overlap with each other, 3a, 3b, 3c a first group of branch pipes connected to the corresponding engine cylinders 1a, 1b, 1c, and 3d, 3e, 3f a second group of branch pipes connected to the corresponding engine cylinders 1d, 1e, 1f; and 4 designates a surge tank. The interior of the surge tank 4 is divided by a separating wall 5 into a first interior chamber 6 and a second interior chamber 7. The first interior chamber 6 and the second interior chamber 7 are interconnected via a connecting bore 8 formed in the separating wall 5, and a control valve 9 is arranged in the connecting bore 8. The first interior chamber 6 and the second interior chamber 7 are connected to an air cleaner 12 via a duct portion 10 and a throttle body 11, and a throttle valve 13 connected to an accelerator pedal (not shown) is arranged in the throttle body 11.

Figure 20:
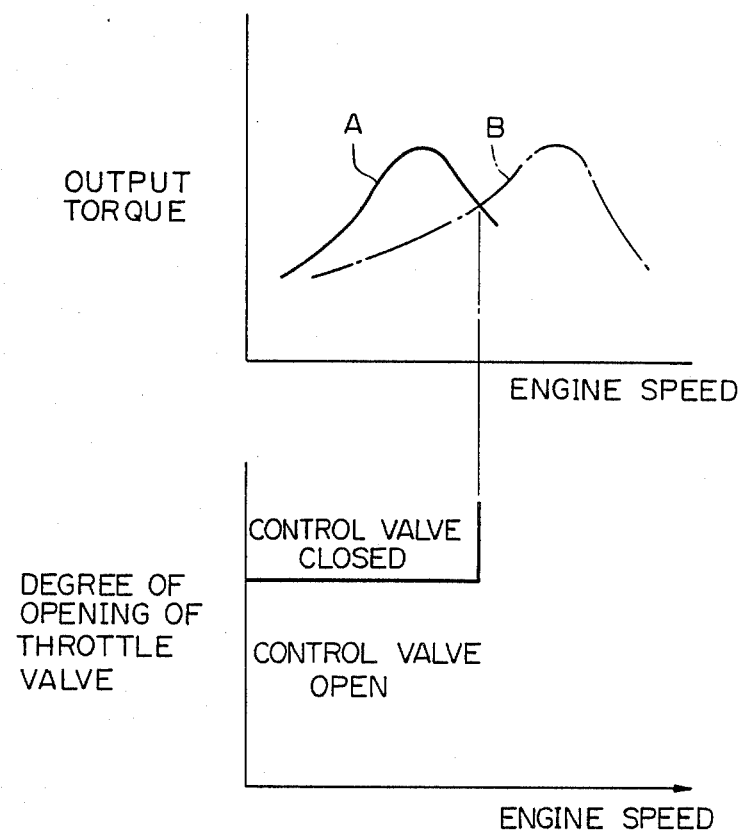
FIG. 20 is a diagram showing the output torque of the engine and the open and closed area of the control valve.

FIG. 20 illustrates an engine operating state in which the control valve 9 is open and an engine operating state in which the control valve 9 is closed. As illustrated in FIG. 20, when the engine is operating under a heavy load at a low speed, the control valve 9 is closed. At this time, the portion 14 dividing the air streams in the duct portion 10 forms a node of vibration caused by the air pulsation, and the magnitude of the vibration of the air pulsation becomes relatively low. Consequently, at this time, as illustrated by the curved line A in FIG. 20, when the engine speed is low, the volumetric efficiency is increased due to the air pulsating operation, and thus the output power of the engine becomes high. Conversely, when the engine is operating under a heavy load at a high speed, the control valve 9 is fully open. At this time, since the open ends of the branch pipes 3a, 3b, 3c, 3e, 3f, which are open to the interior of the surge tank 4, form a node of vibration of the air pulsation, the magnitude of vibration of the air pulsation becomes high. As a result, as illustrated by the curved line B in FIG. 20, when the engine speed becomes high, the volumetric efficiency is increased due to the air pulsating operation, and thus the output power of the engine becomes high.

The construction of an intake device according to the present invention will be hereinafter described with reference to FIGS. 1 through 11. In FIGS. 1 through 11, similar components are indicated by the same reference numerals used in FIG. 19.

Figure 6:
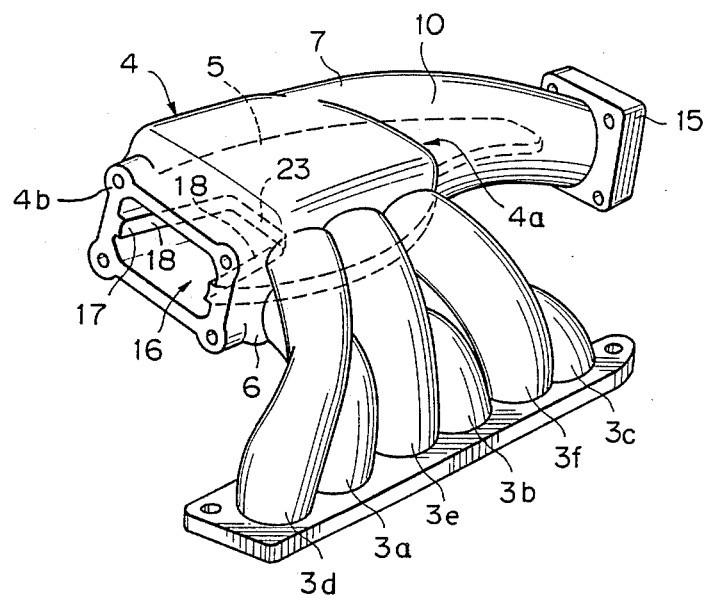
FIG. 6 is a perspective view of a surge tank.

Referring to FIG. 6, the separating wall 5 extending from one end face 4a toward the other end face 4b of the surge tank 4 along the central portion of the interior of the surge tank 4 in the longitudinal direction of the surge tank 4 is formed in the surge tank 4. This separating wall 5 extends into the interior of the duct portion 10 beyond the end face 4a of the surge tank 4. A flange 15 on which the throttle body 11 (FIG. 19) is mounted is integrally formed on the tip of the duct portion 10. The interior of the surge tank 4 is divided into an upper portion and a lower portion by the separating wall 5 so that the first interior chamber 6 is formed below and the second interior chamber 7 is formed above the separating wall 5. The first interior chamber 6 is connected to the engine cylinders 1a, 1b, 1c of the first group (FIG. 19), for example, Nos. 2, 4, 6 cylinders, via the branch pipes 3a, 3b, 3c, and the second interior chamber 7 is connected to the engine cylinders 1d, 1e, 1f of the second group (FIG. 19), for example, Nos. 1, 3, 5 cylinders, via the branch pipes 3d, 3e, 3f.

A rectangular shaped opening 16 is formed in the end face 4b of the surge tank 4, and an approximately U-shaped cutaway portion 17 is formed in the separating wall 5 around the opening 16. Opposite side inner wall 18 of the cutaway portion 17 are tapered so as to diverge toward the end face 4b of the surge tank 4.

Figure 1:
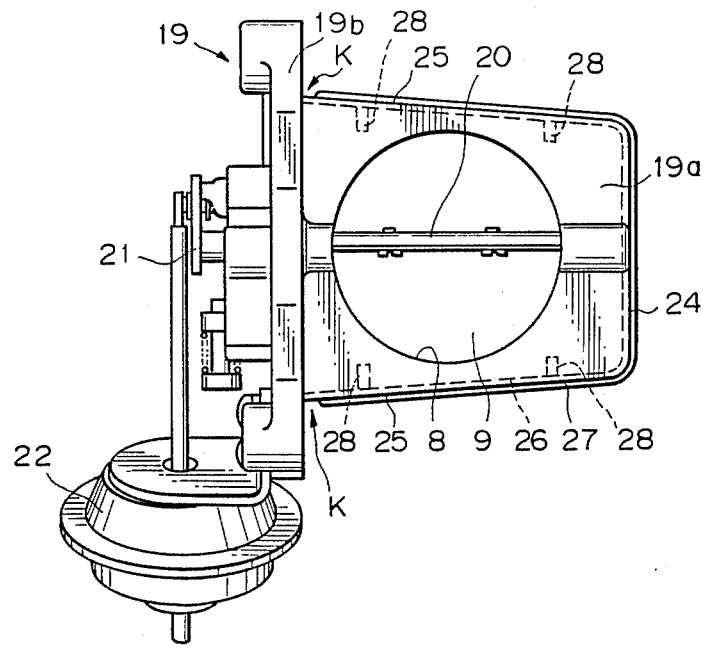
FIG. 1 is a plane view of a valve holder.
Figure 2:
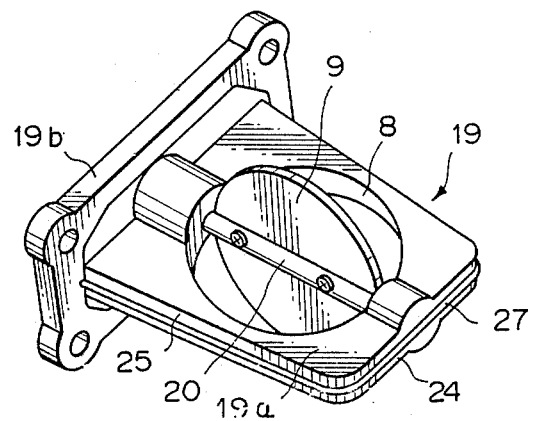
FIG. 2 is a perspective view of the valve holder illustrated in FIG. 1.
Figure 3:
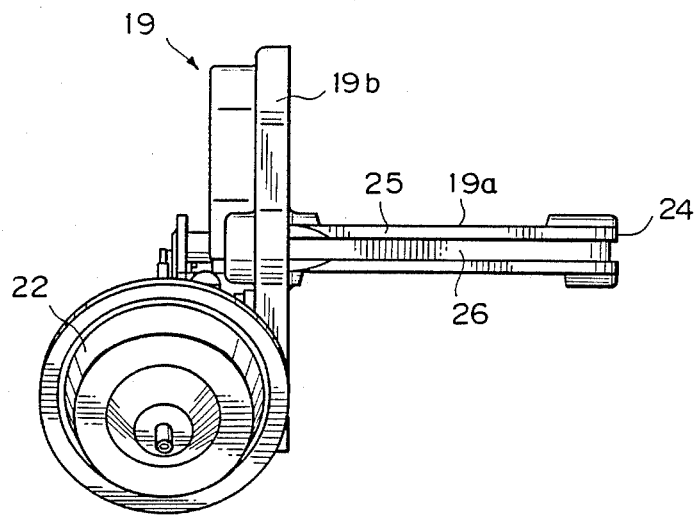
FIG. 3 is a side view of the valve holder illustrated in FIG. 1.
Figure 4:
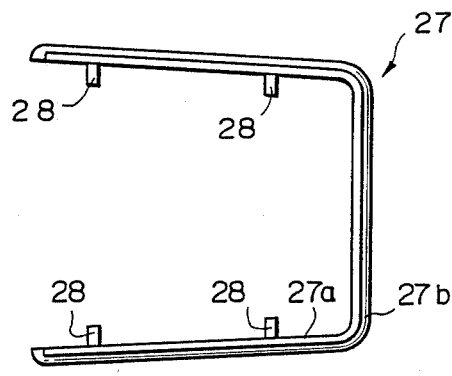
FIG. 4 is a plane view of a seal member.
Figure 5:
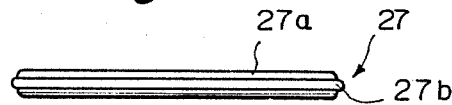
FIG. 5 is a side view of the seal member illustrated in FIG. 4.

As illustrated in FIGS. 1 through 3, a valve holder 19 equipped with the control valve 9 is formed separately from the surge tank 4. The valve holder 19 comprises a separating wall portion 19a integrally formed thereon and fitted into the cutaway portion 17 to form a part of the separating wall 19, and a lid portion 19b integrally formed thereon and covering the opening 16. The connecting bore 8 is formed in and extends through the separating wall portion 19a, and the control valve 9 is arranged in the connecting bore 8. The control valve 9 has a valve shaft 20 rotatably supported in the valve holder 19. One end of the valve shaft 20 extends through the lid portion 19b and projects outside the lid portion 19b, and an arm 21 is fixed onto the projecting end of the valve shaft 20. The tip of the arm 21 is connected to an actuator 22 supported by the lid portion 19b of the valve holder 19 so that the opening of the control valve 9 is controlled by the actuator 22.

As illustrated in FIG. 6, the cutaway portion 17 comprises the tapered opposite side inner walls 18 diverging toward the opening 16 and an end wall 23 which is furthest from the opening 16 and, as illustrated n FIGS. 1 and 2, the separating wall portion 19a of the valve holder 19 comprises a tip wall 24 formed at the tip portion thereof and opposite side outer walls 25 which are tapered so that the distance between the opposite side outer walls 25 is gradually reduced toward the tip wall 24. As illustrated in FIG. 6, the connecting portion of the end wall 24 and the inner side wall 18 of the cutaway portion 17 forms a rounded corner and, as illustrated in FIGS. 1 and 2, the connecting portion of the tip wall 24 and the outer side wall 25 of the separating wall portion 19a of the valve holder 19 forms a rounded corner.

The lid portion 19b of the valve holder 19 is fixed onto the end face 4b of the surge tank 4 by bolts (not shown). The sizes of the separating wall portion 19a and the cutaway portion 17 are determined so that a small clearance is formed between the outer side wall 25 of the separating wall portion 19a and the inner side wall 18 of the cutaway portion 17, and between the tip wall 24 of the separating wall portion 19a and the end wall 23 of the cutaway portion 17, when the valve holder 19 is fixed to the surge tank 4.

Referring to FIGS. 1, 2, 3, 7 and 11, the tip wall 24 and the opposite side outer walls 25 of the separating wall portion 19a have a U-shaped cross-sectional groove 26 formed thereon and extending over the entire length thereof, and a belt-like seal member 27, which, for example, is formed by a gasket made of rubber, is fitted into the groove 26. Referring to FIGS. 4, 5, 7 and 11, the seal member 27 comprises a base portion 27a having an approximately rectangular shaped cross-section, and a projecting lip 27b integrally formed on the outer wall of the base portion 27a and having an approximately semi-circular shaped cross-section. As illustrated in FIGS. 7 and 11, the base portion 27a of the seal member 27 is fitted into the groove 26, and the projecting lip 27b of the seal member 27 projects from the groove 26 and thus will come into contact with the walls 18, 23 of the cutaway portion 17 when the separating wall portion 19a is fitted into the cutaway portion 17. When the separating wall portion 19a is fitted into the cutaway portion 17, the inner wall of the base portion 27a of the seal member 27 is urged onto the bottom wall of the groove 26, and the projecting lip 27b of the seal member 27 is urge onto the concaved end face 23 and the concaved inner side walls 18 of the cutaway portion 17. As can be seen from FIG. 11, the base portion 27a of the seal member 27 has a transverse width smaller than that of the groove 26.

Referring to FIGS. 1, 4 and 8 through 10, a plurality of projections 28 are integrally formed on the inner circumferential wall of the seal member 27, and corresponding projection receiving bores 29 are formed on the outer side walls 25 of the separating wall portion 19a. As illustrated in FIGS. 9 and 10, the projection receiving bores 29 have a cylindrical shape, and the projections 28 have an elliptical shape. The projections 28 have a shape such that the major axis L (FIG. 10) thereof is larger than the diameter D (FIG. 9) of the projection receiving bore 29, and the minor axis S (FIG. 10) thereof is smaller than the diameter D of the projection receiving bore 29. In addition, the projection 28 are formed so that the cross-sectional area thereof is less than 90 percent of that of the projection receiving bores 29. This is because, if the projections 28 are formed so that the cross-sectional area thereof is more than 90 percent of that of the projection receiving bores 29, it is difficult to easily insert the projections 28 into the projection receiving bores 29.

Before the valve holder 19 is fitted into the cutaway portion 17, the seal member 27 is fitted into the groove 26 of the separating wall portion 19a, and the projections 28 are forced into the corresponding projection receiving bores 29. As mentioned above, the major axis L of the projections 28 is larger than the diameter D of the projection receiving bores 29 and, therefore, once the projections 28 are forced into the projection receiving bores 29, the seal member 27 is firmly fixed onto the bottom wall of the groove 26. The seal member 27 is formed so that small clearances K (FIG. 1) are formed between the lid portion 19b and the opposed ends of the seal member 27 when the seal member 27 is fixed onto the bottom wall of the groove 26. Then, the separating wall portion 19a of the valve holder 19 is inserted into the cutaway portion 17. At this time, since the base portion 27a of the seal member 27 is placed within the groove 26, there is no danger that the position of the seal member 27 will be deviated from the correct position and that the seal member 27 will be twisted, and thus the seal member 27 is maintained at the regular position illustrated in FIGS. 7 and 11. In addition, when the separating wall portion 19a is inserted into the cutaway portion 17, an expanding force acts on the seal member 27 due to frictional force. As a result, the seal member 27 expands, and the opposed ends thereof reach the lid portion 19b. Consequently, the entire clearance between the separating wall portion 19a and the cutaway portion 17 is completely sealed by the seal member 27. That is, where the length of the seal member 27 is determined so that the opposed ends of the seal member 27 reach the lid portion 19b when the seal member 27 is fitted into the groove 26, when the separating wall portion 19a is fitted into the cutaway portion 17, the opposed ends of the seal member 27 protrude between the lid portion 19b and the end face 4b of surge tank 4, causing a problem in that the sealing operation between the lid portion 19b. and the end face 4b will be damaged. To eliminate this problem, the size of the seal member 27 is determined so that the clearances K are formed between the lid portion 19b and the opposed ends of the seal member 27.

In addition, when the separating wall portion 19a of the valve holder 19 is inserted into the cutaway portion 17, the projecting lip 27b of the seal member 27 comes into substantially linear contact with the inner side walls 18 of the cutaway portion 17. Consequently, the frictional resistance between the seal member 17 and the inner side walls 18 of the cutaway portion 17 is relatively small, and thus the separating wall portion 19a of the valve holder 19 can be easily fitted into the cutaway portion 17.

As mentioned above, the connecting portion of the tip wall 25 and the outer side wall 24 of the separating wall portion 9a forms a rounded corner, and the connecting portion of the end wall 23 and the inner side wall 18 of the cutaway portion 17 forms a rounded corner, and consequently, a good sealing operation can be obtained at these connecting portions. In addition, as illustrated in FIG. 11, the inner side wall 18 of the cutaway portion 17 has a concaved shape. Consequently, even if the separating wall portion 19a is slightly inclined, the projecting lip 27b of the seal member 27 is still urged onto the inner side wall 18 of the cutaway portion 17, and thus it is possible to further improve the sealing operation between the separating wall portion 19a and the cutaway portion 17.

In the embodiment hereinbefore described, the projections 28 are formed on the inner circumferential wall of the seal member 27, and the projection receiving bores 29 are formed on the outer side walls 25 of the separating wall portion 19a. However, the projections 28 may be formed on the outer side walls 25 of the separating wall portion 19a, and the projection receiving bores 29 may be formed on the inner circumferential wall of the seal member 27.

FIG. 12 illustrates another embodiment of the seal member 27. In this embodiment, a plurality of projecting lips 27c are integrally formed on the base portion 27a of the seal member 27.

Figure 17:
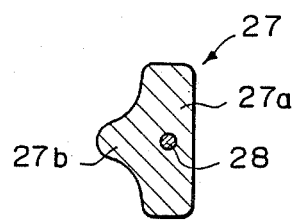
FIG. 17 is a cross-sectional view of a still further embodiment of the seal member.
Figure 18:
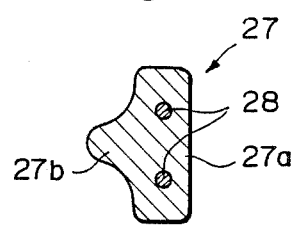
FIG. 18 is a cross-sectional view of a still further embodiment of the seal member.

FIGS. 13 through 16 illustrate a further embodiment of the seal member 27. In this embodiment, a band-like resilient member 28 is embedded in the seal member 27. This resilient member 28 extends over almost the entire length of the seal member 27, and thus the resilient member 28 is approximately U-shaped. The resilient member 28 may be formed by a rod made of an elastic material, as illustrated in FIG. 17, and a pair of the resilient members 28 made of a rod may be embedded in the seal member 27 as illustrated in FIG. 18.

Figure 13:
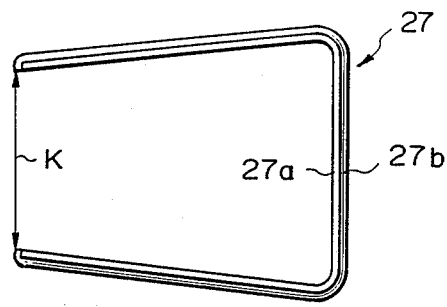
FIG. 13 is a plane view of a further embodiment of the seal member.
Figure 14:
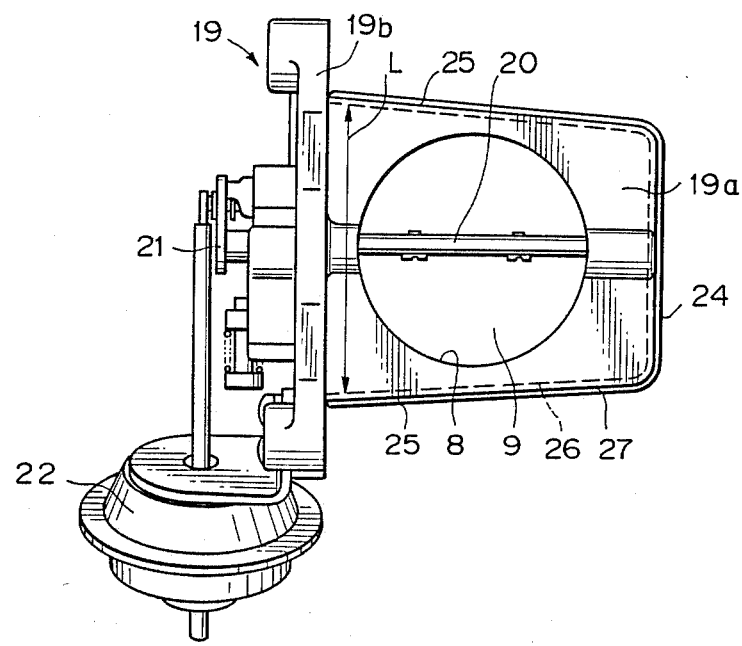
FIG. 14 is a plane view of a valve holder, showing the seal member of FIG. 13 when attached to the valve holder.
Figure 15:
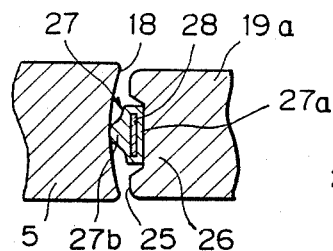
FIG. 15 is a cross-sectional view showing a still further embodiment of the seal member placed between the separating wall portion and the wall of the cutaway portion.
Figure 16:
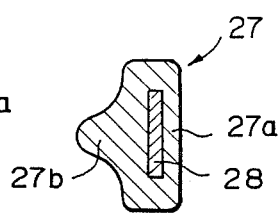
FIG. 16 is an enlarged cross-sectional view of the seal member illustrated in FIG. 15.

FIG. 13 illustrates the seal member 27 when in a free state. As can be seen from FIG. 13, the seal member 77 is formed so that the distance K between the opposed ends of the seal member 27 in the free state is smaller than the distance L of the opposed ends of the seal member 27 when the seal member 27 is inserted into the groove 26 as illustrated in FIG. 14. Consequently, when trying to insert the seal member 27 into the groove 26, the opposed ends of the seal member 27 are spread against the spring force of the resilient member 28, and the seal member 27 is fitted into the groove 26 while still in the spread state. Once the seal member 27 is fitted into the groove 26, the seal member 27 is held firmly in one place due to the spring force of the resilient member 28. Consequently, when the separating wall portion 19a of the valve holder 19 is inserted into the cutaway portion 17, there is no danger that the seal member 27 will be dislodged from the groove 26, and thus it is possible to easily insert the seal member 27 between the groove 26 and the walls 18, 23 of the cutaway portion 17. This embodiment has an advantage in that the seal member 27 can be easily attached to the separating wall portion 19a of the valve holder 19.

While the invention has been described by reference to specific embodiments chosen for purposes of illustration, it should be apparent that numerous modifications could be made thereto by those skilled in the art without departing from the basic concept and scope of the invention.

We claim:

1. An intake device of an internal combustion engine comprising first cylinders having intake strokes which do not overlap with each other, and second cylinders having intake strokes which do not overlap with each other, said intake device comprising:
    an air cleaner;
    a surge tank having a first end and a second end positioned opposite to said first end;
    a separating wall extending from said first end to said second end within said surge tank to divide an interior of said surge tank into a first interior chamber connected to said first cylinders and a second interior chamber connected to said second cylinders, the first end of said surge tank having an opening, said separating wall having a cutaway portion formed adjacent to said opening and having an inner circumferential wall;
    an air duct connected to the second end of said surge tank to interconnect both said first interior chamber and said second interior chamber to said air cleaner via said air duct;
    a valve holder formed separately from said surge tank and comprising a lid portion which covers said opening, and a separating wall portion fitted into said cutaway portion and having an outer circumferential wall facing the inner circumferential wall of said cutaway portion when said valve holder is attached to said surge tank, said separating wall portion having a connecting bore formed therein and interconnecting said first interior chamber and said second interior chamber, the outer circumferential wall of said separating wall portion having a groove formed thereon and extending over the entire length thereof;
    a control valve arranged in said connecting bore and actuated in response to a change in an operating state of the engine; and
    a band-like seal member arranged in said groove and extending approximately the entire length of said groove, said seal member coming into contact with the inner circumferential wall of said cutaway portion to provide a seal between the inner circumferential wall of said cutaway portion and the outer circumferential wall of said separating wall portion.

2. An intake device according to claim 1, wherein said seal member comprises an approximately rectangular cross-sectional shaped base portion fitted into said groove, and a projecting lip projecting from said base portion and in contact with the inner circumferential wall of said cutaway portion.

3. An intake device according to claim 2, wherein said projecting lip has an approximately semi-circular cross-sectional shape.

4. An intake device according to claim 2, wherein a plurality of said projecting lips are formed on said base portion.

5. An intake device according to claim 2, wherein said groove has a transverse width larger than a transverse width of said base portion.

6. An intake device according to claim 2, further comprising fixing means for fixing said base portion of said seal member onto a bottom wall of said groove.

7. An intake device according to claim 6, wherein said fixing means comprises a plurality of projection receiving bores formed on the bottom wall of said groove, and a plurality of projections integrally formed on said base portion and fitted into said corresponding projection receiving bores.

8. An intake device according to claim 7, wherein said projection receiving bores have a cylindrically shaped cross-section, and said projections have an approximately elliptically shaped cross-section, said elliptical projections having a major axis larger than a diameter of said projection receiving bores and having a minor axis smaller than the diameter of said projection receiving bores.

9. An intake device according to claim 8, wherein said projections have a cross-sectional area which is less than 90 percent of that of said projection receiving bores.

10. An intake device according to claim 1, wherein the inner circumferential wall of said cutaway portion has a U-shaped contour, and the outer circumferential wall of said separating wall portion has a U-shaped contour, said real member having a U-shape.

11. An intake device according to claim 10, wherein opposed ends of said groove extend to said lid portion, and opposed ends of said seal member extend to a position near said lid portion to form a clearance between said lid portion and the opposed ends of said seal member when said seal member is fitted into said groove.

12. An intake device according to claim 10, wherein the inner circumferential wall of said cutaway portion has pair of rounded corners, and the outer circumferential wall of said separating wall portion has a pair of rounded corners which face the corresponding rounded corners of said cutaway portion.

13. An intake device according to claim 10, wherein said seal member has a resilient member embedded therein and extending almost the entire length thereof.

14. An intake device according to claim 13, wherein said resilient member is formed by a band-like spring plate.

15. An intake device according to claim 13, wherein said resilient member is formed by at least one elastic rod.

16. An intake device according to claim 13, wherein the distance between opposed ends of said seal member when in a free state is smaller than that when said seal member is fitted into said groove.

17. An intake device according to claim 1, wherein said seal member is made of rubber.

18. An intake device according to claim 1, wherein the inner circumferential wall of said cutaway portion has a concaved shaped cross-section.

19. An intake device according to claim 1, wherein said lid portion is integrally formed with said separating wall portion.

20. An intake device according to claim 1, wherein said lid portion has an actuator mounted thereon for actuating said control valve.

* * * * *

UNITED STATES PATENT AND TRADEMARK OFFICE
CERTIFICATE OF CORRECTION

PATENT NO. : 4,794,886
DATED : 3 January 1989
INVENTOR(S) : Minoru IWAMURO

It is certified that error appears in the above-identified patent and that said Letters Patent is hereby corrected as shown below:

| Column | Line | |
|--------|------|---|
| 2 | 18 | Change "an" to --and--. |
| 4 | 26 | Change "wall" (first occurrence) to --walls--. |
| 5 | 27 | Change "urge" to --urged--. |
| 5 | 44 | Change "projection" to --projections--. |
| 6 | 21 | After "19b" delete ".". |
| 7 | 7 | Change "77" to --27--. |

Signed and Sealed this

Eighth Day of August, 1989

Attest:

DONALD J. QUIGG

*Attesting Officer*    *Commissioner of Patents and Trademarks*